T. B. Bishop's

Impd. Horse Shoe.

No. 72594

PATENTED
DEC 24 1867

Witnesses.
A. L. Shaw
W. A. Walter

Inventor.
T. B. Bishop

United States Patent Office.

THOMAS B. BISHOP, OF BALTIMORE, MARYLAND.

Letters Patent No. 72,594, dated December 24, 1867.

IMPROVEMENT IN HORSE-SHOES.

*The Schedule referred to in these Letters Patent and making part of the same.*

TO ALL WHOM IT MAY CONCERN:

Be it known that I, THOMAS B. BISHOP, of the city and county of Baltimore, in the State of Maryland, have invented a new and improved Horse-Shoe, that can be adjusted and fastened on to a horse's foot without the use of nails, screws, or other iron work; and I do hereby declare the following to be full, clear, and exact description of the same, reference being had to the accompanying drawing forming part of this specification.

Figure 1:
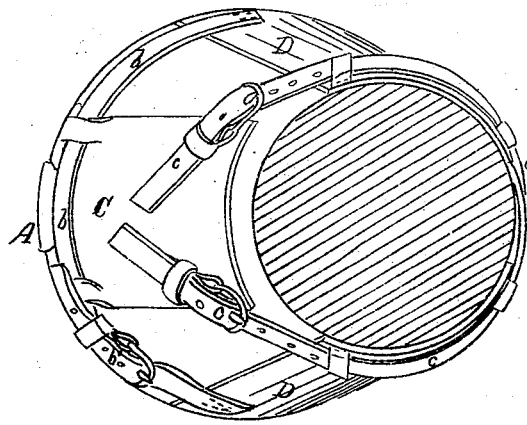
Figure 2:
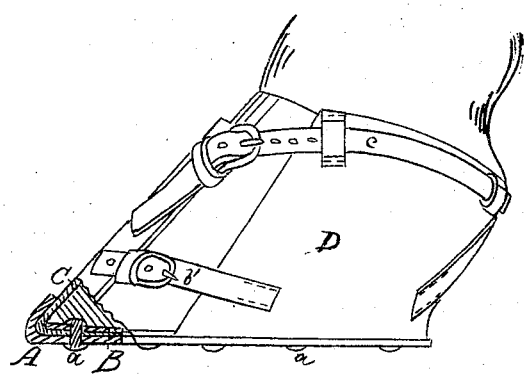
Figure 3:
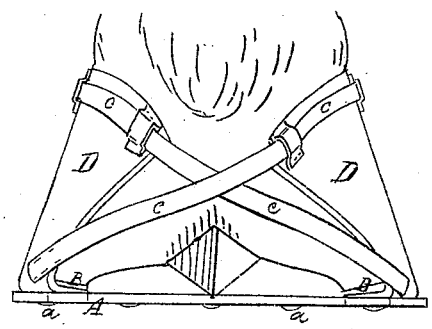

Figure 1 is a top view.
Figure 2 is a side view.
Figure 3 is a rear view.

The object of my invention is to protect the horse's hoof from injury, that may be caused by the use of nails in fastening on the shoe, as in the ordinary manner of shoeing horses, and dispensing entirely with the use of nails, screws, or similar means of fastening shoes, and substituting therefor straps attached to the shoe, as will be hereinafter explained.

To enable others skilled in the art to make and use my invention, I will proceed to describe the mode of constructing, operating, and applying the same.

In the drawing, similar letters of reference indicate like parts in the several figures.

In the accompanying drawing, fig. 1 represents a top view of the shoe as fastened on to the hoof. I take an ordinary shoe, A, and fasten on to it a piece of leather, C D, cut in suitable shape by means of rivets, $a$, placing a thin inner shoe, B, made of good Norway iron, through which, and the leather, the rivets $a$ are passed and riveted. The shoe is then fastened to the horse's hoof by means of straps, $b$ $b'$ and $c$ $c$, and buckled on with an ordinary buckle.

This invention is applicable to the feet of mules and other animals used for the purpose that the horse is found useful for.

What I claim as new, and my invention, and desire to secure by Letters Patent, is—

The fastening of the leather, cut in suitable manner, C D, between the two shoes A B, by means of rivets, and the fastening of the shoe thus made on to the horse's hoof by means of the straps $b$ $b'$ and $c$ $c$, substantially in the manner and for the purpose set forth.

T. B. BISHOP.

Witnesses:
  A. L. SHAW,
  W. N. WALTON.